US005855836A

United States Patent [19]
Leyden et al.

[11] Patent Number: 5,855,836
[45] Date of Patent: Jan. 5, 1999

[54] METHOD FOR SELECTIVE DEPOSITION MODELING

[75] Inventors: Richard N. Leyden, Topanga; Charles W. Hull, Santa Clarita, both of Calif.

[73] Assignee: 3D Systems, Inc., Valencia, Calif.

[21] Appl. No.: 876,695

[22] Filed: Jun. 12, 1997

Related U.S. Application Data

[63] Continuation of Ser. No. 535,772, Sep. 27, 1995, abandoned.

[51] Int. Cl.$^6$ .......................... B29C 35/08; B29C 41/02
[52] U.S. Cl. .................. 264/401; 106/31.3; 106/31.62; 264/308; 364/468.27; 524/62; 524/277; 524/296; 524/495; 524/563; 524/577
[58] Field of Search .................................. 264/308, 401; 106/31.3, 31.62; 364/468.27; 524/62, 277, 296, 495, 563, 577

[56] References Cited

U.S. PATENT DOCUMENTS

| | | | |
|---|---|---|---|
| 2,775,758 | 12/1956 | Munz | 342/179 |
| 3,947,853 | 3/1976 | Denny et al. | 346/75 |
| 4,041,476 | 8/1977 | Swainson | 340/173 |
| 4,247,508 | 1/1981 | Householder | 264/219 |
| 4,386,961 | 6/1983 | Lin | 106/22 |
| 4,390,369 | 6/1983 | Merritt et al. | 106/31 |
| 4,484,948 | 11/1984 | Merritt et al. | 106/31 |
| 4,490,728 | 12/1984 | Vaught et al. | 346/1.1 |
| 4,537,631 | 8/1985 | Cooke et al. | 106/22 |
| 4,575,330 | 3/1986 | Hull | 425/174.4 |
| 4,593,292 | 6/1986 | Lewis | 346/1.1 |
| 4,631,557 | 12/1986 | Cooke et al. | 346/140 |
| 4,659,383 | 4/1987 | Lin et al. | 106/27 |
| 4,665,492 | 5/1987 | Masters | 364/468 |
| 4,667,206 | 5/1987 | DeYoung | 346/1.1 |
| 4,714,934 | 12/1987 | Rogers | 346/140 |
| 4,749,347 | 6/1988 | Valavaara | 425/135 |
| 4,751,528 | 6/1988 | Spehrley, Jr. et al. | 346/140 |
| 4,752,498 | 6/1988 | Fudim | 427/54.1 |
| 4,801,477 | 1/1989 | Fudim | 427/54.1 |
| 4,942,060 | 7/1990 | Grossa | 427/54.1 |
| 4,951,067 | 8/1990 | Spehrley, Jr. et al. | 346/140 |
| 4,961,154 | 10/1990 | Pomerantz et al. | 364/522 |
| 4,992,806 | 2/1991 | Peer | 346/140 |
| 4,999,143 | 3/1991 | Hull et al. | 264/22 |
| 5,021,802 | 6/1991 | Allred | 346/1.1 |
| 5,031,120 | 7/1991 | Pomerantz et al. | 364/522 |
| 5,041,161 | 8/1991 | Cooke et al. | 106/22 |
| 5,043,741 | 8/1991 | Spehrley, Jr. | 346/1.1 |
| 5,059,266 | 10/1991 | Yamane et al. | 156/64 |
| 5,075,689 | 12/1991 | Hoisington | 346/1.1 |
| 5,121,329 | 6/1992 | Crump | 364/468 |
| 5,126,529 | 6/1992 | Weiss et al. | 219/121.6 |
| 5,134,569 | 7/1992 | Masters | 364/474.24 |
| 5,136,515 | 8/1992 | Helinski | 364/468 |
| 5,140,937 | 8/1992 | Yamane et al. | 118/695 |
| 5,141,680 | 8/1992 | Almquist et al. | 264/22 |
| 5,171,360 | 12/1992 | Orme et al. | 75/331 |
| 5,216,616 | 6/1993 | Masters | 364/474.24 |
| 5,260,009 | 11/1993 | Penn | 264/40.1 |
| 5,303,141 | 4/1994 | Batchelder et al. | 364/149 |
| 5,312,224 | 5/1994 | Batchelder et al. | 415/73 |
| 5,340,433 | 8/1994 | Crump | 156/578 |
| 5,362,427 | 11/1994 | Mitchell, Jr. | 264/22 |
| 5,506,607 | 4/1996 | Sanders, Jr. et al. | 347/1 |
| 5,572,431 | 11/1996 | Brown et al. | 364/468.01 |

FOREIGN PATENT DOCUMENTS

| | | |
|---|---|---|
| 1298689 | 4/1992 | Canada . |
| 250121 | 12/1987 | European Pat. Off. . |
| 322257 | 6/1989 | European Pat. Off. . |
| 426363 | 5/1991 | European Pat. Off. . |
| 581445 | 2/1994 | European Pat. Off. . |
| 2583333 | 12/1986 | France . |
| 2583334 | 12/1986 | France . |
| 51-10813 | 4/1976 | Japan . |
| 5-11751 | 3/1989 | Japan . |
| 3-236940 | 10/1991 | Japan . |
| 1556451 | 11/1979 | United Kingdom . |
| WO 89/02575 | 3/1989 | WIPO . |
| WO 90/01727 | 2/1990 | WIPO . |
| WO 91/08902 | 6/1991 | WIPO . |
| Wo 91/10711 | 7/1991 | WIPO . |

OTHER PUBLICATIONS

Wohlers, T., *Cadence*, Plastic Models in Minutes, pp. 101–104 (Jul. 1990).

*Production*, No–Mess Modeling in Minutes, p. 16 (Aug. 1990).

Herbert, A. J. *Journal of Applied Photograpic Engineering*, Solid Object Generation, vol. 8, No. 4, pp. 185–188 (Dec., 1981).

*Flexible Automation*, Stratysys Makes 3D Models in Minutes, pp. 6–7 (Jul. 1990).

Kodama, H. *Review of Scientific Instruments*, Automated Method for Fabricating a Three–Dimensional Plastic Model with Photohardening Polymer, vol. 52, No. 11, pp. 1770–1773 (Nov. 1981).

*Primary Examiner*—Leo B. Tentoni
*Attorney, Agent, or Firm*—Loeb & Loeb LLP; Michael J. Ram; Dennis R. Smalley

[57] ABSTRACT

A novel thermopolymer material adapted for use in thermal stereolithography. More particularly, a thermopolymer material comprising a mixture of: a low shrinkage polymer resin; a low viscosity material such as paraffin wax; at least one microcrystalline wax; a toughening polymer, a plasticizer. Alternative embodiments further include components to improve the materials ability to transfer heat and to improve strength. The subject material, together with the described process greatly reduce part building distortions while retaining desirable toughness, strength and jetting properties.

37 Claims, No Drawings

METHOD FOR SELECTIVE DEPOSITION MODELING

This is a continuation of U.S. patent application Ser. No. 08/535,772, filed Sep. 27, 1995, now abandoned.

BACKGROUND OF THE INVENTION

1. Field of the Invention

Without limiting its scope, this invention relates to improved materials appropriate for use in an apparatus for creating three-dimensional objects, and more specifically, to materials and a method of utilizing such materials in Selective Deposition Modeling (SDM) of Thermal Stereolithography TSL Type Rapid Prototyping and Manufacturing (RP&M) Systems.

2. Background Information

Various approaches to automated or partially automated three-dimensional object production or Rapid Prototyping and Manufacturing have become available in recent years. These approaches are generally characterized by the building up of the three-dimensional objects from computer data descriptive of the object in an additive manner from a plurality of formed and adhered layers, each layer representing a cross-section of the three-dimensional object. Typically, successive layers of the object are formed and adhered to a stack of previously formed and adhered layers. In some RP&M technologies, techniques have been proposed which deviate from a strict layer-by-layer build up process by only partially forming an initial layer followed by partial formation of at least one subsequent layer and then finally followed by completing the formation of the initial layer.

According to one such approach, a three-dimensional object is built up by applying successive layers of unsolidified, flowable material to a working surface, and then selectively exposing the layers to synergistic stimulation in desired patterns, causing the layers to selectively harden into object cross-sections which adhere to previously-formed object cross-sections. In this approach, material is applied to the working surface both to areas which will not become part of an object cross-section, and to areas which will become part of an object cross-section. Typical of this approach is Stereolithography, as described in U.S. Pat. No. 4,575,330 to Hull. According to one embodiment of Stereolithography, the synergistic stimulation is radiation from a UV laser, and the material is a photopolymer. Another example of this approach is Selective Laser Sintering, as described in U.S. Pat. No. 4,863,538, Deckard, in which the synergistic stimulation is radiation from a $CO_2$ laser and the material is a sinterable powder. A third example is Direct Shell Production Casting, as described in U.S. Pat. Nos. 5,340,656 and 5,204,055 to Sachs, et al., in which the synergistic stimulation is a chemical binder, and the material is a powder consisting of particles which bind together upon application of the chemical binder.

According to a second such approach, three-dimensional objects are formed by successively cutting object cross-sections having desired shapes and sizes out of sheets of material, and then adhering the resulting cross-sections together to form the object. Typical of this approach is Laminated Object Manufacturing, as described in U.S. Pat. No. 4,752,352 to Feygin, in which the material is paper, and the means for cutting the sheets into the desired shapes and sizes is a $CO_2$ laser.

Various issues arise with respect to the foregoing approaches however. Though the approach involving a photopolymer and UV laser has come into wide use and produces highly accurate objects, the use of photopolymers presents handling, disposal and toxicity issues. Furthermore, where lasers are used in any of the above approaches, safety concerns exist.

In addition, systems embodying any of the foregoing approaches may be generally expensive to purchase and operate because, for example, components such as lasers and scanning mirror systems are themselves expensive and/or need replacement or calibration over time. Furthermore, any of the foregoing approaches may require too much space and/or require a high level of expertise in operating the building apparatus which may prohibit their use in a typical office setting.

More recently, a third such approach to rapid prototyping and manufacturing has emerged. According to this approach, an object cross-section is formed by selectively depositing an unsolidified, flowable material onto a working surface in desired patterns in areas which will become part of the object cross-section, and then allowing or causing the material to form the object cross-section and simultaneously adhere to a previously-formed object cross-section. These steps are then repeated to successively build up the three-dimensional object cross-section by cross-section. This third approach may be called selective deposition modeling (SDM) due to the manner in which object formation occurs.

Typical of this approach is Thermal Stereolithography as described in U.S. Pat. No. 5,141,680 to Almquist et al. Also typical of this approach is Fused Deposition Modeling as described in U.S. Pat. Nos. 5,121,329 and 5,340,433 to Crump in which a thermosettable material is dispensed while in a molten state and then hardens after being allowed to cool. Another example is described in U.S. Pat. No. 5,260,009 to Penn. Another example is Ballistic Particle Manufacturing as described in U.S. Pat. Nos. 4,665,492; 5,134,569 and 5,216,616 to Masters, in which particles are directed to specific locations to form object cross-sections.

Thermal stereolithography is particularly suitable for use in an office environment because non-reactive, non-toxic materials can be used. Moreover, the process of forming objects using these materials need not involve the use of radiations (e.g. UV radiation, IR radiation and/or laser radiation), heating materials to combustible temperatures (e.g. burning the material along cross-section boundaries), reactive chemicals (e.g. photopolymers) or toxic chemicals (e.g. solvents & the like), complicated cutting machinery, and the like, which can be noisy or pose significant risks if mishandled. Instead, object formation is achieved by heating the material to a flowable temperature then selectively dispensing the material and allowing it to cool.

A critical problem that exists in relation to thermal stereolithography and the like involves finding suitable materials that are capable of being dispensed from the dispensers currently used in such systems (such as an ink jet print head), and which are also capable of forming three-dimensional objects with suitable strength and accuracy once they have been formed. In many situations, these materials must also be suitable for forming support structures for the object being formed.

An additional problem that exist in thermal stereolithography and the like is the need to quickly solidify the flowable material after its dispensed. The time necessary to remove heat sufficient for material solidification can limit the ability to lay a next layer, since newly dispensed material may deform or remelt insufficiently cooled previously deposited layers. This time required for removal of heat from the material can increase the overall object build time.

Hot melt inks developed for dispensing through ink jet print heads and the like are generally designed for printing text on paper. These materials are not designed for and are not suitable for thermal stereolithography because they lack strength, tend to be brittle, and exhibit significant layer to layer distortion.

Pattern waxes suitable for use in investment casting are also generally not suitable for thermal stereolithography. These materials tend to have high viscosities, relatively low toughness, or other properties which makes them difficult to handle and dispense from multi-orifice ink-jet dispensers such as those which may be used in thermal stereolithography. High material viscosity also reduces the ability to build accurate parts. The few pattern waxes in the appropriate viscosity range, such as the Kindt-Collins "PROTOWAX", exhibit relatively high layer to layer distortion. Further, these previous materials tend to have latent heat properties that are not suitable for quick heat dissipation and fast three-dimensional object building.

Other materials that may have properties suitable for either building of the three-dimensional object or for the support structures are not suitable as a single material for both the object and its supporting structures. These materials are either too brittle or too tough such that support removal is difficult and time consuming.

For all the foregoing reasons, there is an unmet need for a material suitable for use in Thermal Stereolithography which is capable of being jetted through an appropriate dispenser (such as multi-orifice, ink-jet type print head), and has the toughness, handling, and dimensional stability properties appropriate for three-dimensional modeling. The material should also have a broad temperature of solidification as well as not being subject to significant layerwise distortion due to shrinkage, curing, or other effects during the part building process. The material should also have a low latent heat of transformation.

3. Related Patents and Applications

The assignee of the subject application, 3D Systems, Inc., has filed the following related applications (now abandoned) all of which are incorporated by reference herein as though set forth in full:

| Filing Date | Application No. | Title |
| --- | --- | --- |
| 9/27/95 | 08/534,813 | Selective Deposition Modeling Method and Apparatus for Forming Three-Dimensional Objects and Supports |
| 9/27/95 | 08/534,447 | Method and Apparatus for Data Manipulation and System Control in a Selective Deposition Modeling System |
| 9/27/95 | 08/534,477 | Selective Deposition Modeling System and Method |

U.S. patent application Ser. No. 08/534,813 is directed to object and support build styles and structures for use in SDM.

U.S. patent application Ser. No. 08/534,447 is directed to data transformation techniques for use in converting 3D object data into support and object data for use In a preferred SDM system (e.g., thermal Stereolithography system). This application is also directed to various data handling, data control, and system control techniques for controlling the preferred system. Alternative data manipulation techniques and control techniques are also described for use in both SDM systems as well as for use in other RP&M systems.

U.S. patent application Ser. No. 08/534,477 is directed to the overall mechanical, electrical, thermal and material feed configuration and method of a preferred SDM system and in particular a preferred Thermal Stereolithography system. Some alternative configurations and methods are also addressed.

The assignee of the instant application, 3D Systems, Inc., is also the assignee of a number of other U.S. Patent Applications and U.S. Patents in RP&M and particularly in stereolithography. The following commonly owned U.S. Patent Applications and U.S. Patents are hereby incorporated by reference as if set forth in full herein.

| App. No. | Topic | Status |
| --- | --- | --- |
| 08/484,582 | Basic Stereolithography | 5,573,722 |
| O8/475,715 | Recoating Dispenser | 5,667,820 |
| 08/473,834 | Building Techniques | 5,711,911 |
| 08/479,875 | Building with Sheets | Abandoned |
| 08/486,098 | Curl Reduction Techniques | Abandoned |
| 08/475,730 | Boolean Layer Comparison Slice | Pending |
| 08/480,670 | Slice | Pending |
| 08/428,950 | Building Techniques/Quickcast | Abandoned |
| 08/428,951 | Simultaneous Multiple Layer Curing | Pending |
| 08/405,812 | Vibrational Recoating Techniques | 5,688,464 |
| 08/402,553 | Doctor Blade/Liquid Level Control | Abandoned |
| 08/382,268 | Rapid Recoating Techniques | Abandoned |
| 07/182,801 | Support Structures | 4,999,143 |
| 07/183,015 | Stress Reliefs | 5,015,424 |
| 07/365,444 | Integrated Stereolithography | 5,143,663 |
| 07/749,125 | Dispensing Material via Ink Jet | 5,174,943 |
| 07/824,819 | SLA-500 | 5,182,715 |
| 07/605,979 | Extra Steps | 5,209,878 |
| 07/929,463 | Powder Coating | 5,234,636 |
| 07/939,549 | Curl Balancing | 5,238,639 |
| 07/967,303 | Method of Dispensing Materials via lnk Jet | 5,344,298 |

SUMMARY OF THE INVENTION

The present invention provides a novel material and method for building three-dimensional objects and associated supporting structures using SDM techniques. In some embodiments the subject material is jetted through an appropriate dispenser (such as an ink jet type print head) at elevated temperatures above ambient and allowed to cool and solidify. The material has the toughness, handling, and dimensional stability properties appropriate for thermal stereolithography. Further, in some embodiments the materials of the present invention have a broad temperature of solidification as well as not being subject to significant layerwise distortion due to shrinkage, curing, or other effects during the part building process.

In some embodiments of the invention, a material for building three-dimensional objects comprising a mixture of: between about 20–60% (by weight) of a low shrinkage polymer resin; between about 10–40% (by weight) of a low viscosity material; between about 10–30% (by weight) of at least one microcrystalline wax; between about 2–25% (by weight) of a toughening polymer; between about 1–5% (by weight) of a plasticizer; between 1–5% of an antioxidant; and preferably a coloring agent is described. Various combinations and mixtures of this material, including alternative components are also described.

In other embodiments of the invention, a thermopolymer material for building three-dimensional objects is described which may include filler materials for dissipating heat from the dispensed material or for adding strength. These filler materials may include black carbon or graphite, solder, or eutectic alloys with very low melting points.

In other embodiments of the invention a material and associated method for rendering the material flowable and for selectively dispensing the flowable material to form an object is described.

In other embodiments of the invention a material and associated method for building three-dimensional object comprising a mixture of thermoplastics, waxes and reactive materials is described.

These and other features, aspects, and advantages of the present invention will become better understood with reference to the following description and appended claims.

DETAILED DESCRIPTION

Overview of a Preferred Thermal Stereolithography Dispensing Apparatus

As discussed, some embodiments of the application are directed to a novel material and method appropriate for use in a rapid prototyping and manufacturing system and particularly to a thermal stereolithography system. However, before discussing these materials and methods, it is appropriate to provide, by way of background, an overview description of a preferred dispensing apparatus used in a thermal stereolithography system. The present invention is not limited or intended to be limited in scope to the described dispensing apparatus, but can be advantageously utilized in any single or multi orifice dispensing apparatus.

A generally preferred print head apparatus for thermal stereolithography is a commercial print head configured for jetting hot melt inks or like materials with similar jetting properties. The print head may be modified to improve jetting of high viscosity fluids. For development of the present invention, a modified version of the 96 Jet Spectra Commercial Printhead, Model No. HDS 96i, a 96 jet monochrome print head from Spectra, Inc., Nashua, N.H., is preferred. The print head is supplied the material of the instant invention in a flowable state, and then emits droplets of the molten material through one or more jetting orifices.

Additional information on a generally preferred thermal stereolithography system is available in aforementioned U.S. patent application Ser. Nos. 08/534,813, 08/534,447 and 08/534,477.

Preferred Embodiments

As noted above, the present invention provides a material and associated method for building three-dimensional objects and associated supporting structures. The subject material is jetted through an appropriate dispenser (such as an ink jet type print head) at elevated temperatures above ambient and has the toughness, handling, and dimensional stability properties appropriate for Thermal Stereolithography. The materials of some embodiments of the present invention have a broad temperature of solidification as well as not being subject to significant layerwise distortion due to shrinkage, curing, or other effects during the part building process.

The preferred material must meet a number of requirements simultaneously. First, it must meet the proscribed limits set by the preferred the ink jet, print head manufacturer, in this case Spectra, Inc.. For its Commercial Print Head which operates at about 130° C., Spectra requires that the viscosity be between about 18 and 25 centipoise (CPS), and the surface tension be between about 24 and 29 dyne/cm. Second, the material must be subject to minimal layerwise distortion or curl. Third, the material must have toughness, handling, and dimensional stability properties that make it appropriate for use in building three-dimensional models.

It has been discovered that a material lacking a precise melting point, i.e., a material which solidifies over a broad temperature range, meets the minimal distortion requirement. The reason is that objects can be built with such materials at temperatures slightly below (preferably within about 10° C.) the solidus temperature of the material. This allows a high proportion of the stress induced in such materials by the shrinkage that occurs due to phase changes to be dissipated by cold flow rather than by producing distortion. Such materials also have a sufficient amount of mechanical strength during the building process such that the object can survive the mechanical action of building.

It has also been discovered that by improving the cooling properties of the material, objects can be built faster, more accurately and at lower cost. As discussed above, if previously dispensed layers are not sufficiently cooled, a next layer can deform or even remelt the solidified previous layers. This cooling may require time for removal of the heat. One method of reducing this cooling time is to develop a material with the above discussed properties but which also has a relatively low latent heat. Additionally, use of a material which has increased thermal conductivity upon solidification emits internal heat more quickly thereby enabling it to cool and solidify more quickly.

The addition of components to increase the thermal conductivity of the material can be accomplished by adding small quantities of a high thermal conducting components such as black-body radiators (i.e. carbon black or graphite). Alternatively, the added conducting material may comprise a substance which selectively radiates at frequencies where the surrounding building material is transparent. Adding conducting material in the range of 5 to 20% (by weight) creates advantageous heat conductive effects but must be adjusted to ensure the material remains suitable for dispensing.

It has also been discovered in an alternate embodiment, that by adding reactive material to the general material formulation yields a material suitable for thermal stereolithography or the like but retaining advantageous properties associated with general stereolithography. These properties include high strength and lower overall object shrinkage upon curing. A range of no less than 20% (by weight) reactive material (i.e. a photopolymer resin) is required for recovering the advantageous properties associated with the reactive material.

A recipe for a general material formulation that achieves these ends includes (1) preferably about 20–60%, and most preferably about 30–60%, (by weight) of a low shrinkage polymer resin such as Piccotex LC; (2) preferably about 10–40%, and most preferably about 10–30%, (by weight) of a low viscosity material such as paraffin wax; (3) preferably about 10–40% (by weight) of one or more microcrystalline waxes; (4) preferably about 2–25%, and most preferably about 2–5%, (by weight) of a toughening polymer (such as AC 400); and (5) preferably about 1–5% (by weight) of a plasticizer. Alternatively about 0.5% of a coloring agent may be added for aesthetic purposes.

Table I describes the component formulations used in the listed examples of the instant invention and their general purpose.

| COMPONENT | |
|---|---|
| A | paraffin wax, melting point 60° C. |
| B | pure monomer hydrocarbon resin comprising a copolymer of α-methylstyrene, vinyl toluene; viscosity 100 cps @ 130° C.; softening point 78–95° C. |

-continued

| COMPONENT | |
|---|---|
| C | medium hard microcrystalline ester wax; viscosity 16 cps @ 100° C.; melting point 78–86° C.; penetration 1.7 mm @ 25° C. |
| D | hard microcrystalline wax; viscosity 16 cps @ 100° C.; melting point 93° C.; penetration 0.55 mm @ 25° C. |
| E | soft microcrystalline wax; viscosity 13 cps @ 100° C.; melting point 69° C.; penetration 2.9 mm @ 25° C. |
| F | ethylene-vinyl acetate copolymer; viscosity 575 cps @ 140° C.; melting point 92° C. |
| G | tetrakis[methytene (3,5-di-tert-butyl-4-hydroxyhydrocinnamate)]methane, an antioxidant; melting point 110–125° C. |
| H | dioctylphthatate (DOP), a plasticizer |
| I | dioctylterephthalate (DOTP), a plasticizer |
| J | 2,6-di-tert-butyl-4-methylphero, an antioxidant |
| K | diisononyl phthatate (DINP), a plasticizer |
| L | dye or coloring compound |
| M | methacrytate terminated polystyrene |
| N | free radical photoinitiator |
| O | polyethytene oxide, average molecular weight 2000 |
| P | epoxy novolac oligomer |
| Q | catonic photoinitiator |
| R | multifunctional acrylate |

The present invention will be further understood from the materials listed in the examples of Table II and Table III. Each of the Examples in Table II were found to produce suitable jettable material as well as object properties when jetted at temperatures in the range of above 50 to about 140 degrees Centigrade, preferably 125 to 135 degrees Centigrade yielding a material having a viscosity upon jetting of 15–30 cps and a surface tension between 23 and 30 dyne/cm. The Examples of Table III include reactive components.

The examples of Table II and Table III have omitted the use of a coloring agent or dye, however it should be understood that a dye can be added in the range of up to 2%, preferably about 0.5% to color the material as desired.

TABLE II

| COMPONENT | | Weight % | | | | | |
|---|---|---|---|---|---|---|---|
| | | Ex. 1 | Ex. 2 | Ex. 3 | Ex. 4 | Ex. 5 | Ex. 6 |
| A | | 21 | 21 | 44 | 25 | 20 | 20 |
| B | | 49 | 49 | 25 | 20 | 25 | 50 |
| C | | 12 | 12 | 12 | — | — | 12 |
| D | | 5 | 5 | 6 | 10 | 5 | 5 |
| E | | 5 | 5 | 6 | 20 | 20 | 5 |
| F | | 4 | 4 | 2.3 | 20 | 25 | 4 |
| G | | 2 | 2 | — | — | — | — |
| H | | — | 2 | — | — | — | — |
| I | | — | — | 2.3 | 2 | 2.5 | 2 |
| J | | — | — | 2.3 | 3 | 2.5 | 2 |
| K | | 2 | — | — | — | — | — |
| PROPERTIES | | | | | | | |
| Viscosity @ 130 °C. | cps/°C. | 22 | 22 | 7 | 20 | 28 | 24 |
| Hardness | shore D | | | | | 28 | 26 |
| Impact Energy | kJ/m$^2$ | | | | | 1.4 | 2.2 |

All of the Examples of Table II were jetted from a modified ink-jet print head as discussed above. The preferred method of dispensing comprised delivering the material to the print head at an elevated temperature above ambient, preferably between about 120 to 130 degrees Centigrade

TABLE III

| COMPONENT | Ex. 7 | Ex. 8 | Ex. 9 |
|---|---|---|---|
| A | 21 | | |
| M | 51 | | |
| C | 12 | | |
| D | 5 | | |
| E | 5 | | |
| F | 5 | | |
| N | 1 | | 1 |
| O | | 77 | 77 |
| P | | 22 | |
| Q | | 1 | |
| R | | | 22 |

The preferred method of dispensing the Examples of Table III comprise delivering the material to the print head at an elevated temperature above ambient, preferably between about 90 to 130 degrees Centigrade.

Table IV specifically describes the currently preferred suppliers of the preferred component formulations and their product names. The product names in quotations are believed to be trademarks of the respective suppliers. Table III is in no way intended to limit the present invention to the use of these suppliers or these specific products.

TABLE IV

| COMPONENT | NAME | SUPPLIER |
|---|---|---|
| A | Paraffin | Kooher Keunen, Sayville N.Y. |
| B | "PICOTEX LC" | Hercules, Inc, Wilmington, DE |
| C | "X-22" | Hoechst Cetanese Corp., Somerville, NJ |
| D | "C-700" | Petrolite Corp., Tulsa, OK |
| E | "ULTRAFLEX" | Petrolite Corp., Tulsa, OK |
| F | "AC400" | Allied Signal Inc., Morristown, NJ |
| G | "IRGANOX 1010" | Ciba-Geigy Corp., Hawthorne, NY |
| H | DOTP | Aldrich Chemical Co., Inc., Milwaukee, WI |
| I | DOP | Aldrich Chemical Co., Inc., Milwaukee, WI |
| J | "BHT" | Aldrich Chemical Co., Inc., Milwaukee, WI |
| K | DINP | Aristech Chemical Corp., Pittsburgh, PA |
| M | "13K-RC" | Sartomer Co., West Chester, PA |
| N | "IRGACURE 184" | Ciba-Geigy Corp., Hawthorne, NY |
| O | Polyethylene | Dow Chemicals, Midland, MI |
| P | "DEN 438" | Dow Chemicals, Midland, MI |
| Q | "UVI 6974" | Union Carbide Chemicals, Danbury, CT |
| R | "SR 399" | Sartomer Co., West Chester, PA |

The material of Example 1 and Example 2 exhibit a dispensing (jetting) viscosity of about 22 cps. When the material is allowed to cool and solidify from about 130° C. getting temperature) to about 25° C. (room temperature), about an 11% shrinkage occurs. When cast, it has a hardness of about 48 shore D; a flex modulus of about 640 n/mm, and a density of about 0.97 g/ml at 25° C. The material of Example 1 utilizes Diisononylphthalate (DINP) in 2% concentration as a plasticizer. The use of DINP is preferred over the DOTP used in Example 2 as it exhibits better material solubility. DOP was replaced with DOTP as a plasticizer in Example 2, in order to reduce the toxicity of the material.

Example 3, exhibited good object properties but was unsuitable for dispensing in the currently preferred modified Spectra print head. This material, which yielded a lower viscosity of about 7 cps at about 130° C., was found better suited for use with print heads of other manufacturers than the currently used Spectra, Inc. model.

Example 4, exhibited suitable object and dispensing properties. The plasticizer DOP was dropped due to its being listed as a potential carcinogen.

Examples 5–6, exhibited suitable object and dispensing properties. However, this material has a viscosity of about 28 cps at about 130° C., which is somewhat too viscous for reliability concerns with the currently preferred print head. Increased object strength was also desired. Additionally, the plasticizer DOP was later dropped due to its being listed as a potential carcinogen.

Example 7 is an analog of Example 1 in which component B, copolymer of α-methylstyrene, vinyl toluene, is replaced with component M, methacrylate terminated polystyrene and the antioxidant is replaced by a photoinitiator. Other formulations using more highly reactive functionalized polymers would give proportionally greater enhancement of physical properties after exposure to actinic radiation.

Examples 8 and 9 utilize alternative wax-like host materials to contain the reactive materials.

An alternative embodiment of the present invention proposes adding other reactive materials in similar quantities to those disclosed in the Examples. This embodiment utilizing a reactive material and associated method could be reacted or exposed to synergistic stimulation (i.e. a UV laser) after the object has been completed or, in the alternative, at various intervals and locations. This embodiment is configured and dispensed at a temperature to generally provide a viscosity of between 18–25 cps.

Other alternative embodiments proposed include adding from about 5–20% (by weight) of a black body type radiator to the material (i.e. powdered black carbon or graphite) or other materials to increase thermal conductivity. This embodiment is also configured and dispensed at a temperature to provide a viscosity of between 18–25 cps.

While embodiments and applications of this invention have been shown and described, it should be apparent to those skilled in the art that many more modifications are possible without departing from the inventive concepts herein. The invention, therefore, is not to be restricted, except in the spirit of the appended claims.

We claim:

1. A selective deposition modeling method of forming at least a portion of a three-dimensional object on a layer-by-layer basis, comprising the steps of:
   a) generating computer data corresponding to layers of said object;
   b) providing a building material which is a fluid at at least one temperature between 80° C. and about 140° C., comprising:
      (i) about 20–80%$_w$ of a reactive material;
      (ii) about 10–30%$_w$ of a low shrinkage polymer resin;
      (iii) about 5–20%$_w$ of at least one microcrystalline wax;
      (iv) about 2–10%$_w$ of a toughening polymer; and
      (v) about 1–3%$_w$ of a plasticizer;
   c) elevating the temperature of said material to a temperature above 80° C. to about 140° C.;
   d) selectively dispensing said material at said elevated temperature according to said computer data to form a layer of said object;
   e) providing an environment that lowers the temperature of said dispensed material;
   f) repeating steps d) and e) to form subsequent layers until at least said portion of the object is formed; and
   g) reacting the reactive material included in at least one layer of the object.

2. The method of claim 1 wherein said reactive material is a photopolymer.

3. The method of claim 1 wherein the temperature of said material is elevated to a temperature about 90° C.–130° C.

4. The method of claim 1 wherein the temperature of said material is elevated until it has a viscosity in the range of about 18 cps to 25 cps.

5. The method of claim 1 wherein said material is configured to solidify over a range of at least 10° C.

6. The method of claim 1 wherein said material comprises:
   a) about 40–50%$_w$ of a photopolymer;
   b) about 20–30%$_w$ of a hydrocarbon resin which is a copolymer of -methylstyrene and vinyl toluene;
   c) about 15–20%$_w$ of a combination of between 5 to 10%$_w$ microcrystalline ester wax, between 5 to 10%$_w$ soft microcrystalline wax, and between 2 to 5%$_w$ hard microcrystalline wax;
   d) about 5–10%$_w$ of a low viscosity polymer with a melting point between 90° C.;
   e) about 1–5%$_w$ of an ethylene-vinyl acetate copolymer with a viscosity of about 575 cps at about 140° C. and a melting point of about 85° C. to 95° C.;
   f) about 1–5%$_w$ of tetrakis methane with a melting point about 110°–125° C.; and
   g) about 1–5%$_w$ of Diisononyl phthalate (DINP).

7. A selective deposition modeling method of forming at least a portion of a three dimensional object on a layer-by-layer basis comprising the steps of:
   a) generating computer data corresponding to the layers of said object;
   b) providing a building material which is solid at ambient temperature and a fluid at at least one temperature between about 80° C. and about 140° C. comprising:
      i) a low shrinkage thermoplastic resin,
      ii) at least a first microcrystalline wax, said microcrystalline wax being present in an amount such that the building material solidifies over a broad temperature range, and
      iii) a low viscosity polymer, said low viscosity polymer being present in an amount such that the viscosity of the building material when heated to a dispensable fluid state is suitable for delivery through a dispenser in a selective deposition modeling system;
   c) elevating the temperature of said building material to a temperature in the range of about 80° C. and about 140° C. to cause said building material to become fluid;
   d) selectively dispensing said building material in accordance with said computer data to form a cross-section of said three dimensional object when said material is elevated to a temperature in said range;
   e) providing an environment that lowers the temperature of said dispensed building material; and
   f) repeating steps d) and e) to form subsequent layers until at least said portion of the object is formed.

8. The method of claim 7 wherein the building material shrinks about 11% on cooling from about 130° C. to about 25° C.

9. The method of claim 8 wherein the building material transforms from a liquid to a solid over a temperature range of about 10° C.

10. The method of claim 9 wherein the building material has a viscosity from about 18 to 25 cps at a temperature from about 125° to about 130° C.

11. A selective deposition modeling method of forming at least a portion of a three dimensional object on a layer-by-layer basis comprising the steps of:

a) generating computer data corresponding to the layers of said object;

b) providing a building material which is solid at ambient temperature and a fluid at at least one temperature between about 80° C. and about 140° C. comprising:
   i) about 10–30%$_w$ of at least one microcrystalline wax,
   ii) about 20–60%$_w$ of a low shrinkage material,
   iii) about 10–40%$_w$ of a low viscosity material, said low viscosity material not being included in i) or ii) above; and
   iv) about 2–25%$_w$ of a toughening polymer c) elevating the temperature of said building material to a temperature in the range of about 80° C. and about 140° C.;

d) selectively dispensing a layer of said building material in accordance with said computer data to form a layer of said three dimensional object;

e) providing an environment that lowers the temperature of said dispensed building material; and D repeating steps d) and e) to form subsequent layers until at least said portion of said three dimensional object is formed.

12. The method of claim 11 wherein the building material further comprises about 1–5%$_w$ of a plasticizer.

13. The method of claim 11 wherein the selective deposition modeling method is a thermal stereolithography method.

14. The method of claim 13 wherein the material is dispensed from an ink jet device.

15. The method of claim 11 wherein said building material is configured to have a viscosity between about 7 to 28 cps at at least one temperature between about 125° C. and 135° C.

16. The method of claimed 11 wherein the temperature of said material is elevated into said range of temperatures to a temperature such that it has a viscosity for dispensing of between about 7 cps to about 28 cps.

17. The method of claim 11 wherein said material is dispensed into an environment which is within about 10° C. of a solidus temperature of the material.

18. The method of claim 1 wherein the selective deposition modeling method is a thermal stereolithography method.

19. The method of claim 18 wherein the material is dispensed using an ink jet.

20. The method of claim 1 wherein said material is dispensed into an environment which is within about 10° C. of a solidus temperature of the material.

21. The method of claim 7 wherein the selective deposition modeling method is a thermal stereolithography method.

22. The method of claim 21 wherein the material is dispensed from an ink jet device.

23. The method of claim 7 wherein the building material is dispensed into an environment which is within about 10° C. of a solidus temperature of the material.

24. The method of claim 7 wherein the building material has a viscosity of about 7–28 cps at a temperature of about 125° C. to about 135° C.

25. The method of claim 8 wherein the building material transforms from a liquid to a solid over a temperature range of at least 10° C.

26. The method of claim 7 additionally comprising a coloring agent.

27. The method of claim 11 additionally comprising a coloring agent.

28. The method of claim 20 comprising up to about 2.0%$_w$ of the coloring agent.

29. The method of claim 7 additionally comprising the formation of a support structure from the building material, the support structure being removed after formation of the object.

30. The method of claim 11 additionally comprising the formation of a support structure from the building material, the support structure being removed after formation of the object.

31. The method of claim 1 wherein said building material is configured to have a viscosity of less than 25 cps at a temperature of about 90° C.

32. The method of claim 12 wherein said building material is configured to have a viscosity between about 18 and 25 cps at a temperature of about 130° C.

33. The method of claim 12 wherein said building material is configured to have a viscosity of less than 25 cps at a temperature of about 130° C.

34. The method of claim 32 wherein the temperature of said material is elevated to a temperature of about 125° C. and 135° C.

35. The method of claim 12 wherein the temperature of said material is elevated until it has a viscosity for dispensing in the range of about 18 cps to about 25 cps.

36. The method of claim 32 wherein said material is configured to solidify over a range of at least 10° C.

37. The method of claim 32 wherein said material comprises;
   a) about 20%$_w$ of a paraffin wax;
   b) about 50%$_w$ of a hydrocarbon resin which is a copolymer of α-methylstyrene and vinyl toluene;
   c) a combination of between 10 to 15%$_w$ medium hard microcrystalline ester wax, between 5 to 20%$_w$ soft microcrystalline wax and between 5 to 10%$_w$ hard microcrystalline wax;
   d) about 1–5%$_w$ of an ethylene-vinyl acetate copolymer with a viscosity of about 140° C. and a melting point of about 85° to 95° C.;
   e) about 1–5%$_w$ of tetrakis methane with a melting point of about 110°–125° C.; and
   f) about 1–5%$_w$ of Diisonony phthalate (DINP).

* * * * *